United States Patent

Rigopulos

[15] 3,682,318

[45] Aug. 8, 1972

[54] TUBULAR ULTRAFILTRATION MEMBRANE AND SUPPORT

[72] Inventor: Peter N. Rigopulos, Boxford, Mass. 01921

[73] Assignee: Amicon Corporation, Lexington, Mass.

[22] Filed: June 10, 1970

[21] Appl. No.: 44,974

[52] U.S. Cl. .................................. 210/321, 210/433
[51] Int. Cl. ........................................... B01d 31/00
[58] Field of Search......210/490, 491, 489, 500, 321, 210/433, 23, 497, 497.1, 414

[56] References Cited

UNITED STATES PATENTS

| | | | |
|---|---|---|---|
| 3,488,768 | 1/1970 | Rigopulos | 210/23 |
| 3,547,272 | 12/1970 | Shaines et al. | 210/490 X |
| 3,421,782 | 1/1969 | Kalish et al. | 285/248 |
| 3,480,147 | 11/1969 | Kanyok | 210/321 |
| 3,542,204 | 11/1970 | Clark | 210/433 X |

FOREIGN PATENTS OR APPLICATIONS

| | | | |
|---|---|---|---|
| 664,429 | 5/1929 | France | 210/433 |

OTHER PUBLICATIONS

OSW R & D Report No. 86, Design and Construction of a Desalination Pilot Plant, Jan. 1964, pages 13 & 14.

*Primary Examiner*—Frank A. Spear, Jr.
*Attorney*—R. W. Furlong

[57] ABSTRACT

An ultrafiltration device comprising an anisotropic ultrafiltration membrane tube secured around a liquid-impermeable cylindrical core. The core has a plurality of peripherally spaced, axial ribs along its outer surface, which define therebetween a plurality of axial grooves. The anisotropic membrane comprises a polymer film comprising a porous support layer and a less porous barrier layer integral therewith at one face of the support layer, and the barrier layer of the membrane tube is in contact with the ribs, so that the membrane defines, with the grooves, a plurality of axially extending channels adjacent this barrier layer and having a fluid inlet at one end and a fluid outlet at the other.

10 Claims, 3 Drawing Figures

PATENTED AUG 8 1972 3,682,318

TUBULAR ULTRAFILTRATION MEMBRANE AND SUPPORT

This invention relates to ultrafiltration.

Ultrafiltration is a process of separation whereby a solution, containing a solute of molecular dimensions significantly greater than the molecular dimensions of the solvent in which it is dissolved, is depleted of the solute by being subject to such pressure that the solvent is forced to flow through a membrane. "Ultrafiltration" is the term preferably used to describe such pressure-activated separations involving solutions of solutes of from about 500 molecular weight and above; the term is also conveniently used for processes involving, instead of dissolved molecules, colloidalsized particles.

An object of this invention is to provide improved ultrafiltration devices which are rugged and durable, capable of operating at large capacity while withstanding high fluid pressures, and yet are simple to construct and use.

Another object is to provide anisotropic membranes in tubular form providing a large effective membrane surface in a relatively small volume, while also utilizing efficient and precise thin channel ultrafiltration techniques.

The invention features an ultrafiltration device comprising an anisotropic ultrafiltration membrane tube secured around a liquid-impermeable cylindrical core. The core has a plurality of peripherally spaced, axial ribs along its outer surface, which define therebetween a plurality of axial grooves. The anisotropic membrane comprises a polymer film comprising a porous support layer and a less porous barrier layer integral therewith at one face of the support layer, and the barrier layer of the membrane tube is in contact with the ribs, so that the membrane defines, with the grooves, a plurality of axially extending channels adjacent this barrier layer and having a fluid inlet at one end and a fluid outlet at the other.

The membrane tube can be formed of a flat sheet of membraneous material wrapped around the core with its margins joined along an axially extending sealing zone to form the continuous tube. Sealing can be accomplished, for example, by heating the margins of the membrane until a heat seal is accomplished, by disposing an adhesive between overlapping margins, by a pressure-sensitive porous adhesive tape adhered to the margins, or by a combination of two or more of these methods.

In a preferred embodiment, the membrane tube has a second porous support layer, such as a weftless polyethylene sheet, secured to the support layer of the polymer of film, and a perforate reinforcing layer, such as a braided tube, encompasses the outer surface of the membrane tube to secure the membrane tube on the core.

Preferably, the ultrafiltration device also has at least one end sealing member for sealing an axial end of the membrane (at least the inlet end), which membrane is arranged to be secured to the respective end of the core (although preferably having a portion spaced from the core) and has a passage constructed to provide a fluid flow path through the member to a portion of the membrane a distance from the sealed end and adjacent the axial channels.

Other objects, features and advantages will appear to one skilled in the art from the following description of a preferred embodiment of the invention, taken together with the attached drawings thereof, in which.

Figure 1:
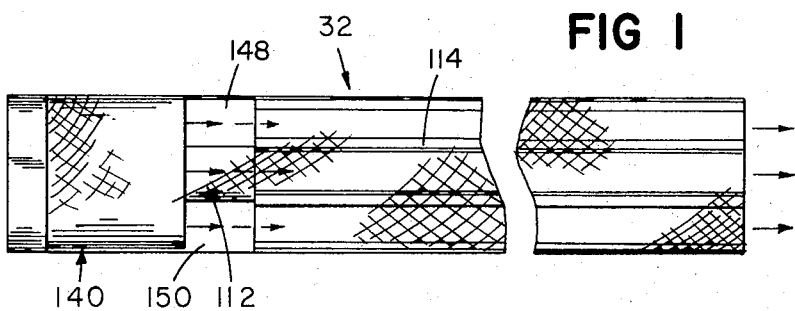
FIG. 1 is an elevational view of an ultrafiltration device embodying this invention.
Figure 2:
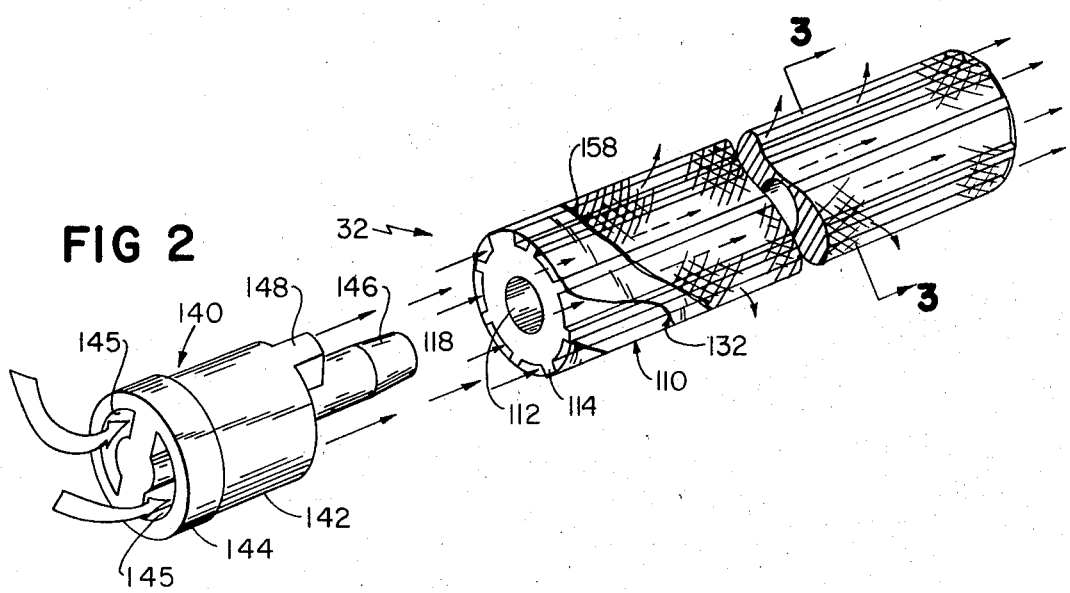
FIG. 2 is an exploded view of the device of claim 1.

The figures show an ultrafiltration device 32 having a molded plastic (e.g., fiber-reinforced nylon), liquid-impermeable stiff tubular supporting core 110, which has an inner cylindrical bore 112. A plurality of spaced longitudinally extending ribs 114 project from outer cylindrical wall surface 113 of the core and define a plurality of shallow axial grooves 118, preferably about 10-30 mils deep; that is, the ribs 114 are all of approximately the same radial height, their outer surfaces lying in a cylinder coaxial with cylindrical wall surface 113.

A filtration membrane in the form of a tube 132, which may be made from a flat rectangular sheet by sealing its margins together along a zone 134 extending longitudinally or spirally of the tube, is supported by and in contact with the outer surfaces of ribs 114. The overall diameter of each tube 132 is of the order of ¼ to ⅛ inch, and the tubular membrane thus forms with grooves 118 between the ribs longitudinally extending fluid passages approximately 10 to 30 mils in depth and ⅛ inch to ¼ inch wide.

At the inlet end of core 110 is provided an extension plug or sealing member 140 which may be molded of the same material as the core and which provides means for introducing fluid into passages 118. The plug 140 is in the form of a cylinder 142 having a diameter equal to that formed by the outer surfaces of ribs 114, together with an end flange or shoulder 144 of slightly greater diameter serving to protect the end of membrane tube 132 which abuts against the flange. Plug 140 is provided with axial apertures 145 and an imperforate central hub 146 adapted to enter into bore 112 of core 110 in a snug fit. One or more axially projecting spacer lugs 148 are provided to abut the end of core 110 to leave a gap 150 between the end walls of plug 140 and core 110 through which fluid may flow from axial apertures 145 to passages 118. Unless the outlet end of the membrane is also to be under fluid pressure (as when units such as apparatus 10 are arranged in series for additional filtration), no extension plug is needed at that end; the thin channels merely are open at that end.

Figure 3:
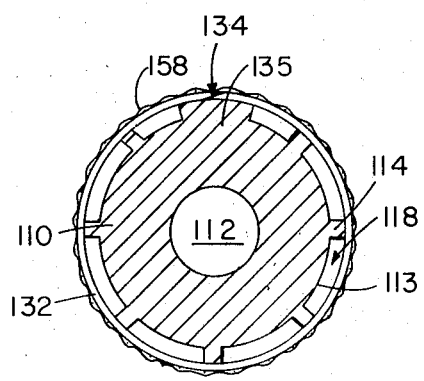
FIG. 3 is a sectional view along line 3—3 of FIG. 2.

A porous or perforate reinforcing member, such as a braided tubular member 158, is arranged as shown in FIG. 3 to encompass the outer surface of membrane 132 so as to secure the membrane on the core and reinforce and confine it against the fluid pressure applied radially outwardly thereto in the filtration apparatus. Among the useful materials from which reinforcing members may be made are nylon, fiberglass, and suitable polyesters (e.g., polyethylene terephthalate), particularly in the form of filaments or threads suitable for braiding.

Core 110 may be of any desired cross-sectional configuration, triangular, rectangular, or polygonal as well as circular. The ribs are preferably uniformly spaced apart by a distance of ⅛ inch to ¼ inch. While the ribs 114 in the embodiment illustrated are parallel to the axis of core 110, they may also extend spirally longitudinally of the core.

Preferred membranes are ultrafiltration membranes; and, in particular, "anisotropic" ultrafiltration membranes, which consist of a support layer and a barrier layer, so constructed that the barrier layer will pass less of a given solute than will the support layer. Typically, these membranes are formed of polymers having good mechanical integrity, most advantageously those crystalline and/or glassy thermoplastic polymers known to the art. By crystalline and glassy polymers are meant those materials which possess from about five to 50 percent by weight crystallinity as measured by X-ray diffraction techniques known to the art and/or a glass transition temperature ($T_g$) of at least about 20° C. Particularly advantageous are polymers of inherently low water sorptivity, which unlike the cellulose acetate materials known to the membrane art may be allowed to dry during storage without losing their beneficial mechanical and processing characteristics. These polymers are those having water-absorptivities of less than about 10 percent by weight of moisture at 25° C and 100 percent relative humidity. Among the useful polymers are polycarbonates (e.g., those prepared under the trade designation "Lexan," unplasticized polyvinyl chloride, suitable copolymers of polyvinyl chloride, and modacrylic polymer sold under the trade name "Dynel" by Union Carbide Corporation.

Preferred anisotropic membranes are cast, from a casting dope of the polymer in an organic solvent, as a film on an additional support, such as a weftless polyethylene sheet. The exposed side of the film is then contacted with a diluent characterized by a high degree of miscibility with the organic solvent and a sufficiently low degree of compatibility with the casting dope to effect rapid precipitation of the polymer. The diluent is maintained in contact with the membrane until substantially all the solvent has been replaced with diluent.

The resultant anisotropic membranes consist of the base support which has no effect on the filtration properties of the cast polymer, a macroscopically thick film of the cast porous polymer support portion, usually more than about 0.002 and less than about 0.050 of an inch in thickness, and at the exposed surface of this film, an exceedingly thin, but relatively dense barrier layer or "skin" of from about 0.1 to 5.0 microns thickness of microporous polymer in which the average effective pore diameter is in the millimicron range, for example 1.0 to 500 millimicrons—i.e., about one-tenth to one hundredth the thickness of the skin. The support portion thus comprises a much more coarsely porous polymer structure through which fluid can pass with little hydraulic resistance. When such a membrane is employed as a "molecular filter" with the "skin-side" upstream in contact with fluid under pressure, virtually all resistance to fluid flow through the membrane is encountered in the "skin," and molecules or particles of dimensions larger than the pores in the "skin" are selectively retained. The over-all hydraulic resistance to fluid flow through the membrane is very low, as is the tendency of such membranes to become plugged or fouled.

Since the cast polymer and base support may be of different materials, (e.g., polyethylene and a modacrylic) joining their adjacent surfaces in the sealing zone 134 is preferably done by employing an adhesive between the surfaces being joined, as well as by applying an additional adhesive strip (e.g., an adhesived coated acrylic such as nylon) along the joint. If these facing surfaces are of the same or similar materials, the surfaces may be, instead, heat sealed along zone 134.

The membrane is oriented with the barrier layer facing the core 110. It is unnecessary to seal the membrane to the core, since the subsequently applied braided cover, which is tensioned against the membrane, will maintain the membrane in position, and also control therefore the shape and outer diameter of the membranes. The braid further prevents creep of the membrane axially along the core.

In operation, fluid to be filtered is introduced, under pressure, into the axial apertures 145 of plug 140, and therethrough to gap 150, downstream of the end of membrane tube 132, into the shallow fluid passages between grooves 118 and the adjacent surface of membrane tube 132. Ultrafiltrate ("solvent" or other smaller molecularly dimensioned component) passes out through membrane tube 132, and its perforate reinforcing member 158, and may be collected in an appropriate collector (not shown). The components which are of too large molecular dimensions to pass through the membrane walls continue along the shallow passages and may be collected at the downstream end of the passages. Where further concentration of fluid is desired, the fluid collected at the downstream end of the passages may be fed to another sequentially arranged ultrafiltration device. For uninterrupted flow, the upstream devices preferably have extension plugs at both their upstream and downstream ends.

The extension plug protects the end of the membrane tube by causing fluid to enter substantially downstream thereof, thus preventing leakage around the end of the tube. The end plug arrangement is desireably in view of the very high pressures (e.g., 200 p.s.i.) and flow velocities (e.g., 10 ft./sec.) encountered in the device.

The shallow depth of the axial channels provided between the core and membrane tube provides a large area of membrane surface exposed to a relatively small adjacent volume of fluid, yet while occupying only a small volume and additionally provides laminar flow along the membrane—all of which results in highly efficient filtration.

When the membrane has reached the end of its useful life, the entire device, because of its economical construction, may simply be discarded and replaced with a new device.

The ultrafiltration devices of this invention may also be used in a closely-spaced parallel array, connected to common upstream and downstream fluid supply and recovery manifolds, respectively. Such arrays are capable of delivering a high volume of ultrafiltrate while occupying a small volume of space, and may be provided as a single, discardable cartridge. Exemplary of such ultrafiltration apparatus utilizing such cartridges is that shown in the assignee's copending U.S. Pat. application Ser. No. 45,115, filed June 10, 1970. in the name of Edward A. Agranat, and entitled "FILTRATION DEVICE."

Other embodiments will occur to those skilled in the art and are within the following claims.

What is claimed is:

1. An ultrafiltration device comprising a liquid-impermeable cylindrical core having a plurality of peripherally spaced axial ribs located on the outer surface of said core and defining therebetween a plurality of axial grooves, and an anisotropic ultrafiltration membrane tube secured around said core in contact with said ribs, defining with said grooves a plurality of axially extending channels having a fluid inlet at one end and a fluid outlet at the opposite end, said anisotropic ultrafiltration membrane comprising a polymer film comprising a porous support layer and a less porous barrier layer integral therewith, said barrier layer being in contact with said rib, and a perforate reinforcing member encompassing the outer surface of said membrane tube under tension to secure said membrane tube on said core and to reinforce and confine it against fluid pressure within said tube.

2. The device of claim 1 wherein said membrane tube is formed of a flat sheet of membraneous material wrapped about said core, with its margins joined along an axially extending sealing zone to form a continuous tube.

3. The device of claim 2 wherein said membrane margins are heat sealed along said sealing zone.

4. The device of claim 2 wherein said membrane margins overlap in said sealing zone, and an adhesive is disposed between said overlapping margins.

5. The device of claim 2 wherein a layer of pressure-sensitive, porous adhesive tape is adhered to said membrane margins along said sealing zone.

6. The device of claim 1 wherein said membrane tube includes a second porous support layer secured to the said support layer of said polymer film.

7. The device of claim 6 wherein said second support layer is a weftless polyethylene sheet.

8. The device of claim 1 wherein said reinforcing layer is a braided tube.

9. The device of claim 1 including at least one end sealing member for sealing an axial end of said membrane, said member arranged to be secured to the respective end of said core, and having a passage constructed to provide a fluid flow path through said sealing member to a portion of said membrane a distance from the said sealed axial end of said membrane and adjacent said axial channels.

10. The device of claim 9 wherein the inner end of said sealing member is at least partially spaced from the adjacent outer end of said core to define a fluid chamber therebetween communicating with said passage through said sealing member and with the respective end of said axial channels.

* * * * *

UNITED STATES PATENT OFFICE
CERTIFICATE OF CORRECTION

Patent No. 3,682,318                Dated August 8, 1972

Inventor(s) Peter N. Rigopulos

It is certified that error appears in the above-identified patent and that said Letters Patent are hereby corrected as shown below:

Under References cited, "664,429 France" should be "665,429 France".

Signed and sealed this 2nd day of January 1973.

(SEAL)
Attest:

EDWARD M. FLETCHER, JR.
Attesting Officer

ROBERT GOTTSCHALK
Commissioner of Patents